United States Patent [19]

Nubel et al.

[11] Patent Number: 5,731,383
[45] Date of Patent: *Mar. 24, 1998

[54] DIFUNCTIONAL TELECHELIC LINEAR NON-CROSSLINKED POLYOLEFINS

[75] Inventors: Philip O. Nubel; Howard B. Yokelson, both of Naperville, Ill.

[73] Assignee: Amoco Corporation, Chicago, Ill.

[*] Notice: The term of this patent shall not extend beyond the expiration date of Pat. No. 5,559,190.

[21] Appl. No.: 706,893

[22] Filed: Sep. 3, 1996

Related U.S. Application Data

[63] Continuation of Ser. No. 459,652, Jun. 2, 1995, Pat. No. 5,559,190, which is a continuation-in-part of Ser. No. 68,236, May 27, 1993, Pat. No. 5,403,904, Ser. No. 68,240, May 27, 1993, Pat. No. 5,519,101, and Ser. No. 167,668, Dec. 15, 1993, Pat. No. 5,512,635.

[51] Int. Cl.$^6$ .................. C08F 8/14; C08F 8/32; C08G 61/12

[52] U.S. Cl. ............ 525/297; 525/270; 525/289; 525/290; 525/296; 525/301; 525/303; 525/309; 525/330.3; 525/330.5; 525/330.6; 525/382; 525/384; 526/281; 526/283; 526/308; 526/309; 526/329.1; 526/318.6; 526/331; 560/181; 560/202; 564/485; 568/857

[58] Field of Search .................. 525/270, 289, 525/297, 290, 296, 301, 303, 309, 330.3, 330.5, 330.6, 382, 384; 526/281, 283, 308, 329.1, 309, 318.6, 331; 560/181, 202; 564/485; 568/857

[56] References Cited

U.S. PATENT DOCUMENTS

| | | | |
|---|---|---|---|
| 5,403,904 | 4/1995 | Nubel et al. | 526/139 |
| 5,512,635 | 4/1996 | Nubel et al. | 525/247 |
| 5,519,101 | 5/1996 | Nubel et al. | 526/142 |
| 5,559,190 | 9/1996 | Nubel et al. | 525/270 |

FOREIGN PATENT DOCUMENTS 0173473  5/1986  European Pat. Off. .

OTHER PUBLICATIONS

Otton, J., et al., "Metathesis Of Functionalised Olefins: Homogeneous Cross–Metathesis Of Cycloolefin And Ethylenic Esters", Journal of Molecular Catalysis (1980), 8: 313–324.

Reyx, D., et al., "Application de la reaction de metathese a la synthese de prepolymeres α, ω–bifonctionnels", Makromol. Chem. (1982), 183: 173–183 with English language summary.

Reyx, D., et al., "Distribution of the Dienic and Trienic α, ω–Difunctionalized Oligomers in the Cross–metathesis between Cyclopentene and Dimethyl Hex–3–enedioate", Journal of Molecular Catalysis (1986), 36: 101–105.

Reyx, D., et al., "Synthese de polymeres α, ω–bifonctionnels par reaction de metathese. Methodologie d'approche des differences de reactivite des sites carbeniques en presence", Makromol. Chem. (1990), 191: 251–267 with English language summary and a partial English language translation of the article.

Cramail, H., et al., "Functional Oligomers Of Norbornene, 2a) Kinetics And Mechanism Of The Oligomerization Reaction", Makromol. Chem., Macromol. Symp. (1991), 42/43: 281–292.

Hillmyer, M.A., and R.H. Grubbs, "Preparation of Hydroxytelechelic Poly(butadiene) via Ring–Opening Metathesis Polymerization Employing a Well–Defined Metathesis Catalyst", Macromolecules (Feb. 15, 1993), 26: 872–874.

Hillmyer, M.A., and R.H. Grubbs, "The ROMP of COD by a Well–Defined Metathesis Catalyst in the Presence of a Difunctional Chain Transfer Agent: The Preparation of Hydroxy–Telechelic 1,4–Poly(butadiene)", Polymer Preprints (Aug. 1993), 34: 388–389.

Chung, T.C., and M. Chasmawala, "Synthesis of Telechelic 1,4–Polybutadiene by Metathesis Reactions and Borane Monomers", Macromolecules (1992), 25: 5137–5144.

Chung, T.C., "Synthesis of functional polymers via borane monomers and metathesis catalysts", Journal of Molecular Catalysis (1992), 76: 15–31.

Ho, H.T., et al., "Metathesis Polymerization of Substituted Norbornenes: Microstructure of the Polymers of Some Ester Derivatives", European Polymer Journal (1989), 25: 805–811.

Patton, P.A., et al., "Factors Influencing the Rate of Tungsten Hexachloride/Tetramethyltin–Catalyzed Olefin Metathesis Polymerization: Monomer Ring Strain Is Not Important", Macromolecules (1987), 20: 778–782.

Primary Examiner—Fred Teskin
Attorney, Agent, or Firm—G. Byron Stover; Wallace L. Oliver

[57] ABSTRACT

This invention relates to difunctional telechelic linear non-crosslinked polyolefins without pendant chain branched groups. The polyolefin compounds of this invention are useful for preparing high molecular weight polyesters, polyamides, polyureas and polyurethanes of high density without branching of the polymer chains, and with low permeability to gases and solvents.

15 Claims, No Drawings

DIFUNCTIONAL TELECHELIC LINEAR NON-CROSSLINKED POLYOLEFINS

CROSS REFERENCE TO RELATED APPLICATIONS

This is a continuation of application Ser. No. 08/459,652, filed Jun. 2, 1995, now U.S. Pat. No. 5,559,190, which is a continuation-in-part of application Ser. No. 08/068,236 filed May 27, 1993, now U.S. Pat. No. 5,403,904, application Ser. No. 08/068,240, filed May 27, 1993, now U.S. Pat. No. 5,519,101, and application Ser. No. 08/167,668, filed Dec. 15, 1993, now U.S. Pat. No. 5,512,635, all incorporated by reference herein.

FIELD OF THE INVENTION

This invention relates to a novel class of difunctional telechelic linear non-crosslinked polyolefins without pendant chain branched groups wherein the functionality number of the terminal groups is 2.0, the functional groups are other than vinyl groups, and the polyolefins are of the structure

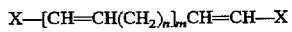

$$X-[CH=CH(CH_2)_n]_m CH=CH-X$$

wherein X is selected from the group consisting of an ester moiety, a hydroxyl moiety, and an amine moiety. X can be selected from the group consisting of —COOR, —CH$_2$OC(O)R, —(CH$_2$)$_8$COOR, —CH$_2$OH, —(CH$_2$)$_8$COO(CH$_2$)$_p$OH, —COO(CH$_2$)$_p$OH, —(CH$_2$)$_8$C(O)NR'(CH$_2$)$_p$NHR' and —C(O)NR'(CH$_2$)$_p$NHR' wherein p is 2 to 12, R is an alkyl group of from 1 to 8 carbon atoms, R' is hydrogen or an alkyl group of from 1 to 8 carbon atoms, n is 1 to 10, and m is a number average value of up to 1000.

The difunctional telechelic linear non-crosslinked polyolefin without pendant chain branched groups wherein the X's are ester moieties such as —COOR, —CH$_2$OC(O)R, or —(CH$_2$)$_8$COOR is prepared by consecutive olefin metathesis reactions comprising an olefin metathesis reaction of an acyclic olefin with a linear terminal monofunctional group consisting of an ester moiety other than a vinyl group to prepare a linear terminal mono- or difunctional olefin wherein the functional groups are ester moieties of increased molecular chain length with other than terminal vinyl groups, and an olefin metathesis reaction of a linear terminal mono- or difunctional olefin with a cyclic olefin to prepare a linear terminal difunctional olefin of increased molecular chain length. The resulting linear terminal difunctional olefin wherein the functional groups are ester groups of increased molecular chain length has no pendant chain branched groups, and the molecular chain lengths are relatively uniform. The ester moiety is selected from the group consisting of an acrylate moiety, a methacrylate moiety, an allyl acetate, an undecylenate moiety, allyl propionate and allyl butyrate. Low molecular weight co-product olefins such as ethylene are removed from the olefin metathesis reactions by suitable means comprising evaporation, crystallization, purging the olefin metathesis reactions with an inert gas, and combinations thereof. The difunctional telechelic linear polyolefins wherein X is a hydroxyl or amine moiety are prepared by conventional hydrolysis, alcoholysis and amination reactions from the difunctional telechelic linear polyolefins wherein X is an ester moiety.

The resulting difunctional telechelic linear non-crosslinked polyolefin without pendant carbon groups, wherein the functional groups are ester moieties and have a 2.0 functionality number, are suitably substituted in conventional manner by reactive moieties selected from the group —CH$_2$OH, —(CH$_2$)$_8$COO(CH$_2$)$_p$OH,—COO(CH$_2$)$_p$OH, —(CH$_2$)$_8$C(O)NR'(CH$_2$)$_p$NHR' and C(O)NR'(CH$_2$)$_p$NHR' wherein p is 2 to 12, R is an alkyl group of 1 to 8 carbon atoms, and R' is hydrogen or an alkyl group of from 1 to 8 carbon atoms.

The polydispersity of this novel class of difunctional telechelic non-crosslinked polyolefins is from 1.3 to 3.0. The polyolefins are soluble in common organic solvents and demonstrate no evidence of pendant carbon chains with multiple carbon attachments under high resolution nuclear magnetic resonance (NMR).

The difunctional telechelic linear non-crosslinked polyolefins of this invention accordingly have unique physical properties because of the linearity, non-crosslinking, low polydispersity and unsaturation and are capable of providing these properties of linearity, non-crosslinking, low polydispersity, and difunctionality to unsaturated polymeric compounds. The difunctional polyolefins of this invention are useful in preparing high density polyester, polyamide, polyurea, and polyurethane polymers of a high molecular weight. The absence of vinyl groups as reactive terminal moieties permits the preparation of high molecular weight linear polymers without branching of the polymer chains, thus permitting the preparation of high density polymers with less permeability to gas and solvents and increased tensile strength versus polymers with branched chains.

It is therefore an object of this invention to provide a new group of polyolefins comprising difunctional telechelic linear non-crosslinked polyolefins which can be the precursors of polymeric compounds with improved properties such as polyesters, polyamides, polyureas and polyurethanes.

BACKGROUND OF THE INVENTION

Although the preparation of monomeric unsaturated mono- and difunctional compounds, such as mono- and dicarboxylic acid esters by an addition reaction of an olefin with a mono- or a dicarboxylic acid ester is well-known, as is taught in U.S. Pat. 3,783,136, it is difficult to regulate the attachment of the ester groups due to the nonselective character of the addition reaction.

Well-known methods for the preparation of polymeric unsaturated molecules with functional end groups have been by two ways: by ring-opening polymerization of cycloolefins with unsaturated organic diesters and by metathesis degradation of unsaturated polymer chains with unsaturated organic diesters. These methods have been used to prepare ester-group terminated certain average weight polyalkenes.

Linear alpha, omega difunctional polymeric compounds prepared by an olefin metathesis reaction have been prepared by ring-opening polymerization of cyclic olefins in the presence of unsaturated organic diesters or by metathesis degradation of unsaturated polymer chains in the presence of unsaturated organic diesters, but these methods have suffered from several disadvantages. It is difficult to prepare truly linear products without crosslinking and branching occurring, as is taught in U.S. Pat. No. 4,010,224, in an olefin metathesis reaction or an unsaturated polymer with cycloolefins. Also, as taught in U.S. Pat. No. 3,798,175, an olefin metathesis reaction of a cyclic olefin in the presence of an unsaturated carboxylic acid ester, the resulting polymers can contain a statistical distribution of repeating units. Random length molecular structures of random chain lengths therefore occur with attendant increased polydispersity.

As is well-known, side reactions can occur during olefin metathesis reactions. These side reactions include alkylation, isomerization, cyclization and addition across double bonds present in the molecular structure, resulting in cross-linked structures with non-linear characteristics. It has been found that the difunctional telechelic linear polyolefins of this invention prepared by olefin metathesis reactions wherein the functional groups are other than vinyl groups show little evidence of these side reactions in the preparation of these polyolefins. These polyolefins are true linear non-crosslinked polyolefins without pendant carbon groups as determined by nuclear magnetic resonance (NMR).

DESCRIPTION OF THE PRIOR ART

The preparation of ester group-terminated polyalkenomers and the resulting polymers by olefin metathesis have been taught in German Democratic Republic Patents Nos. 146,052 and 146,053.

G.D.R. Patent No. 146,052 discloses the preparation of ester-group-terminated polyalkenomers by ring-opening metathesis polymerization of cycloolefins with unsaturated dicarboxylic acid esters to prepare telechelic polyalkenomers of a certain average molecular weight. The molar ratio of the cycloolefins to the diesters is stated as determining the number average molecular weight (Mn) which can range from 500 to 10,000. The diesters include 2-butenedicarboxylic acid dimethyl ester, 3-hexenedicarboxylic acid diester, 8-hexadecenedicarboxylic acid dimethyl ester, and 1,4-diacetoxy-2-butene. A greater molar ratio of cycloolefin to diester increases the number average molecular weight of the resulting polymer. The products can be rubber-like polymers, which may indicate a degree of cross-linking.

G.D.R. Patent No. 146,053 discloses the preparation of ester-group-terminated polyolefins of a certain average molecular weight by metathesis degradation of unsaturated polymers with unsaturated organic diesters. The average molecular weight depends on the molar ratio of unsaturated monomer units of the polymer used to the diesters used. A greater molar ratio of polymer to diesters increases the molecular weight range of the ester-group-terminated polyolefin, which can be from 500 to 10,000. Unsaturated polymers available from ring-opening polymerization can be used as can polymers prepared by diene polymerization, for example, 1,4-cis-polybutadiene, and other copolymers as ABS rubber or SB rubber. The product can be solid rubber-like polyolefins, which may indicate cross-linking. Diesters taught as useful are as listed in G.D.R. Patent No. 146,052, as noted above.

The processes of G.D.R. Patents No. 146,052 and 146,053 are directed to utilization of ring-opening polymerization of cycloolefins or by metathesis degradation of unsaturated polymers which also can be obtained by ring-opening polymerization or by diene polymerization to prepare ester-group-terminated polyalkenomers which can be cross-linked polymers of a certain average molecular weight.

A disadvantage of metathesis degradation of unsaturated polymers is the wide polydispersity of the lower molecular weight products in addition to the formation of vinyl-group terminated products.

A further disadvantage of the metathesis process of G.D.R. Patents No. 146,052 and 146,053 is that the availability of specific cyccloolefins, unsaturated polymers, and diesters limits the preparation of telechelic ester-group-terminated polyalkenomers. Mono-esters with inherent advantages of ready availability and potentially lower economic cost are not factors in these processes. No evidence is presented as to the preparation of difunctional products with defined end groups from other than diesters in either of these patents. Additionally, the advantages of utilizing monoesters which heretofore have not been utilized in metathesis polymerization processes have not been obtained because of non-reactivity in metathesis reactions.

For example, as noted by K. I. Ivin, op. cit., p. 151, methyl acrylate is an unreactive unsaturated ester in a self-metathesis reaction although methyl methacrylate readily reacts in a cross-metathesis reaction with hex-3-ene, as reported by Verkuijlen, et al, *Recl. Trav. Chim., Pays-Bas* (1977) 96, M86.

As noted above, procedures to prepare polymeric hydrocarbons having reactive functional groups have utilized cyclic olefinic compounds in conjunction with a ring opening step. Ofstead, U.S. Pat. No. 3,597,403, teaches a process for ring-opening polymerization of unsaturated alicyclic compounds, preferably unsaturated alicyclic compounds of a single unsaturated alicyclic ring containing at least four carbon atoms and not more than five carbon atoms wherein the carbon-to-carbon double bonds in the ring are not adjacent and are non-conjugated in the presence of a catalyst system comprising an alkylaluminum halide, molecular oxygen, and a compound of tungsten or molybdenum. Novel solid polymers can be products. Examples II, III, V–VIII produced solid, rubbery polymers, indicating cross-linking. Streck, et al, U.S. Pat. No. 3,798,175 teaches a process for ring opening polymerization of cyclic olefins and forming terminal carbalkoxy groups by employing a catalyst system consisting essentially of (1) a tungsten or molybdenum compound, (2) an organoaluminum compound, (3) an unsaturated carboxylic acid ester. Streck '175 teaches that an unsaturated carboxylic acid ester containing at least one carbon-carbon double bond varies the molecular weight of the resulting polymer by reaction with the double bond of the ring-opened cyclic olefin to produce side chains. Polymers produced by the process of '175 using monobasic monounsaturated esters have only one carboxyalkyl group per molecule. Streck, et al., U.S. Pat. No. 3,857,825, discloses a similar reaction in the presence of a polymeric hydrocarbon having an unsubstituted non-conjugated ethylene double bond for production of polymeric hydrocarbons having reactive silyl end groups by a ring-opening polymerization of a cyclic olefin in the presence of a catalytic amount of a halogenated compound of a metal selected from the group consisting of niobium, tantalum, molybdenum, tungsten and rhenium and a halogen, alkoxy, carboxylate or Lewis acid. However, Streck, *J. Mol. Catalysis*, 15 (1982) 3–19, teaches that esters of acrylic acid and esters of methacrylic acid are ineffective in participating in a metathesis reaction.

Accordingly, although the prior art teaches the preparation of polymeric hydrocarbons having functional end groups such as esters, amines, hydroxyls and other reactive groups, investigators have continued to search for an olefin metathesis process and catalyst for preparation of linear non-crosslinked difunctional polyolefins with defined end groups, including acrylate and methacrylate end groups, high difunctional purity and having an average functionality of 2.0, as determined by NMR, from monofunctional reactants.

Wagener, et al. *Makromol. Chem.* 191,365–374 (1990) reported a successful acyclic diene metathesis polymerization wherein vinyl terminated oligo(octenylene)s were synthesized using a Lewis acid-free catalyst, W(CH-t-Bu) (N-2, 6-$C_6H_3$-i-$Pr_2$)(OCMe($CF_3$)$_2$)$_2$, the catalyst taught by Schrock, et al. *J. Am. Chem. Soc.* 110, 1423 (1988). Ratio of reactant to catalyst was in a mole ration of 500:1. Yields were reported as essentially quantitative.

Preparation of difunctional terminated unsaturated polymers by olefin metathesis from a polyene and a olefin containing a functional group has been reported by Wagener, et al., *Macromolecules*, 26, 2137–2138 (1993); Wagener, et al., *Polymer Preprints*, 34, 469–470 (1993), using the catalyst taught by Schrock, et al. *J. Am. Chem. Soc.*, 110, 1423 (1988) as noted above.

However, the catalyst composition reported as used by Wagener has not been disclosed as commercially available and is difficult and expensive to prepare.

Olefin metathesis Lewis acid catalyst systems have been extensively reported in the prior art for preparation of polymeric hydrocarbons. Calderon, et al., U.S. Pat. No. 3,597,406, teach the polymerization of hydrocarbon substituted cyclic compounds to prepare polymers with side chains by a ring-opening polymerization of hydrocarbon substituted cyclooctadienes in the presence of a Lewis acid catalyst system comprising (A) at least one organometallic compound wherein the metal is selected from the group consisting of In, IIa, IIb, and IIIa of the Periodic Table of Elements, (B) at least one transition metal salt selected from the group consisting of tungsten and molybdenum halides, and (C) at least one compound of the general formula R-Y-H wherein Y is oxygen, H is hydrogen and R is a radical selected from the group consisting of (1) hydrogen (2) alkyl, (3) aryl, (4) arylalkyl, (5) alkaryl, (6) alkenyl and radicals thereof. Ofstead, U.S. Pat. No. 3,935,179, teaches a ring-opening polymerization of alicyclic hydrocarbons in the presence of a Lewis acid catalyst comprising (A) tungsten or molybdenum halides, (B) alkyl aluminum halides, and (C) an alcohol which may optionally contain a halogen constituent, and (D) an alcohol which has a nitrile substituent for ring opening polymerization of cycloolefins by cleavage of the carbon-to-carbon double bonds. The resulting polymers have repeating units derived from opening of the ring. Similar ring-opening polymerizations of cyclic olefins in presence of a Lewis acid catalyst are also taught in U.S. Pat. Nos. 3,974,092; 3,974,094; 4,010,224; 4,020,254; and 4,172,932.

Olefin metathesis Lewis acid catalyst systems for polymerizing and copolymerizing diolefins have been taught in the prior art wherein the catalyst system is comprised of a Lewis acid and a particular compound which permits carrying out the polymerization and copolymerization reactions starting with diolefins to give products of desired properties. For example, U.S. Pat. No. 4,429,089 teaches a catalytic system for polymerizing and copolymerizing diolefins comprising a Lewis acid, an aluminum compound and a particular compound belonging to the lanthanide series to give products having a high content of 1,4-cis units and high molecular weights from aliphatic conjugated diolefins such as 1,3-butadiene, 1,3-pentadiene, isoprene and their mixtures. U.S. Pat. No. 4,469,809 teaches a two-part-metathesis catalyst system wherein the first part of the catalyst system is comprised of a metathesis catalyst, preferably WOCl$_4$, WCl$_6$, and a Lewis base to moderate the polymerization rate of a tungsten/monomer solution, the monomer preferably dicyclopentadiene. The second part of the catalyst system comprises an activator such as tetrabutyltin, triethylaluminum and similar compounds. The activator solution includes an ester, ether, ketone or nitrile which serves to moderate the rate of polymerization. Similar catalyst systems for polymerization of dicyclopentadiene are taught in U.S. Pat. Nos. 4,520,181; 4,699,963; and 4,918,039 wherein a Lewis base was used to moderate the polymerization reaction of a Lewis acid. U.S. Pat. No. 4,918,039 teaches that in the presence of a transition metal halide and a catalyst activator comprising an alkyl tin reagent, the presence of a Lewis base to stabilize the polymerization reaction can be omitted since an alkyl tin activator is a poorer Lewis acid. U.S. Pat. No. 4,977,226 teaches a ring-opening process for polymerizing a norbornene monomer in the presence of a metathesis catalyst system comprising a tungsten compound such as tungsten hexachloride in the presence of a Lewis base to prevent premature polymerization.

K. Ichikawa, et al., *J. Org. Chem.*, 41,2633–2635 (1976) taught use of a Lewis base catalyst as being effective for reactions of 1-alkenes using a WCl$_6$/Bu$_4$Sn catalyst with addition of esters, acetonitrile, phenylacetylene, dicyclopentadiene and ethers to improve the selectivity to the metathesis reaction by depressing side reactions. The reactants were 1-pentene, 1-hexene, 1-heptene, 1-octene and 1-decene. The optimum range of the Sn/W mole ratio was from 2:1 to 8:1. The ratio of 1-octene to WCl6 was 20-400. Products were ethylene and a symmetric internal alkene.

With the exception of the teachings of Wagener, *Makromol. Chem.* 191, 365–374 (1990); *Macromolecules*, 26, 2137–2138 (1993); *Polymer Preprints*, 34,469–470 (1993), prior investigators have not dealt with the problem of preparing difunctional olefinic compounds with a functionality number of 2.0 by a metathesis reaction wherein the functional groups are defined terminal reactive groups other than vinyl groups from acyclic monofunctional olefin compounds and which previously had been found non-reactive in a metathesis reaction. As detailed above, Lewis acid catalysts are taught in the preparation of olefinic compounds via a ring opening reaction. The effect of the presence of Lewis base upon the rate of polymerization by a Lewis acid of an olefinic compound has been recognized but there has been no teaching or inference that a metathesis catalyst system comprising a Lewis acid, an activator and a Lewis base can be used to prepare difunctional olefinic compounds by cross-metathesis reactions between acyclic olefins and between acyclic olefins and cyclic olefins wherein the acyclic olefins comprise acrylic and methacrylic diesters.

The difunctional telechelic linear non-crosslinked polyolefins of the structure X—[CH=CH(CH2)$_n$]$_m$CH=CH—X of the instant invention are prepared by metathesis reactions which are self or cross-metathesis reactions between acyclic olefins and/or cross-metathesis reactions between cyclic and acyclic olefins.

SUMMARY OF THE INVENTION

This invention relates to difunctional telechelic linear non-crosslinked polyolefins without pendant chain branched groups wherein the functionality number is 2.0, the functional groups are other than vinyl groups, and the polyolefins are of the structure

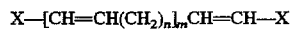

wherein X is selected from the group consisting of an ester moiety, a hydroxyl moiety and an amine moiety. X can be selected from the group consisting of —COOR, —CH$_2$OC(O)R, —(CH$_2$)$_8$COOR, —CH$_2$OH, —(CH$_2$)$_8$COO(CH$_2$)$_p$OH, —COO(CH$_2$)$_p$OH, —(CH$_2$)$_8$C(O)NR'(CH$_2$)$_p$NHR' and —C(O)NR'(CH$_2$)$_p$NHR' wherein p is 2 to 12, R is an alkyl group of 1 to 8 carbon atoms, R' is hydrogen or an alkyl group of from 1 to 8 carbon atoms, n is 1 to 10, and m is a number average value of up to 1000. The polydispersity of the difunctional telechelic linear non-crosslinked polyolefins is from 1.3 to 3.0. The polyolefins with ester moieties are prepared by olefin metathesis reactions with removal of low molecular weight olefinic co-products and with conventional substitution reactions to obtain truly linear difunctional non-crosslinked polyolefins with hydroxyl or amine moieties. These polyolefins have relatively uniform molecular chain length, a functionality number of 2.0, no vinyl terminal groups, show no evidence of chain branched groups derived from the olefin metathesis reactions, and are suitable for preparing high molecular weight polyester, polyamide, polyurea, and polyurethane polymers of high density without branching of the polymer chains, and with low permeability to gases and solvents.

DETAILED DESCRIPTION OF THE INVENTION

The invention also relates to a difunctional telechelic linear non-crosslinked polyolefin having a functionality number of 2.0, as determined by NMR, polydispersity is from 1.3 to 3.0, and a polyolefin molecular structure:

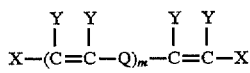

wherein

is at least one ring-opened olefinic group of a cyclic olefin of from 4 to 30 carbon atoms, Q is selected from hydrocarbon moieties and halogen-substituted hydrocarbon moieties, X is selected from —COOR, —$(CH_2)_n$OC(O)R, —$(CH_2)_8$COOR, —$(CH_2)_n$OH, —$(CH_2)_8$COO$(CH_2)_p$OH, —COO$(CH_2)_p$OH, —$(CH_2)_8$C(O)NR'$(CH_2)_p$NHR' and —C(O)NR'$(CH_2)_p$NHR', wherein Ys are the same or different and are individually selected from hydrogen, halogen, an alkyl group, and an aryl group, wherein p is 2 to 12, wherein R is an alkyl group of from 1 to 8 carbon atoms, R' is selected from hydrogen and an alkyl group of 1 to 8 carbon atoms, n is 1 to 3, and m is a number average value of up to 1000.

The difunctional telechelic linear non-crosslinked polyolefins with defined end groups of this invention are prepared as non-crosslinked linear functional polyolefins in a first reaction and as telechelic polyolefins of high difunctional purity by olefin metathesis reactions in a second reaction. The first reaction (A) of the process of this invention comprises an acyclic olefin metathesis reaction wherein linear acyclic olefins of up to 30 carbon atoms and containing at least one functional group comprising an ester group are reacted to prepare linear mono- and difunctional olefinic products. The second reaction (B) comprises a ring-opening polymerization of a cyclic olefin in the presence of the linear mono- and difunctional olefin products of reaction (A), or methyl acrylate or methyl methacrylate. The compositions obtained thereby are reacted in conventional condensation polymerization reactions to form macromolecules, conventional transesterification reactions to prepare alcohols, and conventional amination reactions to form amines, which, in turn, can be further reacted to prepare additional compounds suitable for further reactions.

Difunctional telechelic linear non-crosslinked polyolefins of this invention are defined as polyolefins consisting essentially of strictly linear hydrocarbon chains comprising repeating units of 3 to 30 carbon atoms, said hydrocarbon chains without any side chains or pendant groups which would cause cross-linking. The number of repeating units can be from 3 to about 10,000.

Difunctional telechelic linear non-crosslinked polyolefins of this invention are defined as difunctional polyolefins containing two terminal functional end-groups other than vinyl groups and the average functionality number is 2.0, as determined by NMR. The terminal functional end-groups are specifically defined as reactive terminal groups other than vinyl groups. The difunctional polymers of this invention are further defined as having a predominant absence of non-functional terminal end-groups. The functionality numbers refer to the number of terminal functional groups of the hydrocarbon chains of the polyolefins prepared by the process of this invention.

Methyl acrylate and methyl methacrylate do not react in self-metathesis reactions to prepare dimers of methyl acrylate and methyl methacrylate but alkyl undecylenates do react in a self-metathesis reaction. Methyl acrylate and methyl methacrylate therefore are unsuitable as self-metathesis reactants for reaction (A) but are suitable as reactants with an acyclic hydrocarbon olefin in reaction (A) and as reactants for reaction (B) whereas alkyl undecylenates can react in a self-metathesis reaction in reaction (A) and are suitable reactants for both reaction (A) and reaction (B).

Accordingly, a linear acyclic functional olefinic composition which can comprise a mixture of monofunctional, difunctional, and nonfunctional compounds is suitable for use in reaction (A) wherein the functional group is an ester group such as an acrylate group or a methacrylate group or an undecylenate group or an acetate group, e.g., methyl acrylate, or methyl methacrylate, or methyl undecylenate, or allyl acetate, and the other reactant is an acyclic hydrocarbon olefin compound of of up to about 30 carbon atoms. The reaction is in the presence of a catalyst composition comprising a transition metal chloride, oxyhalide, oxide or ammonium salt, an organic tin compound or aluminum halide reagent, and an organic Lewis base. In reaction (B), the resulting mixture is reacted with a cyclic olefin to prepare a difunctional polyolefin. Purification of the mixture to remove low molecular weight olefinic co-products such as ethylene is used in both reactions.

It has been found that linear acrylate, or methacrylate, or undecylenate- or acetate- terminated difunctional polyolefins can be prepared in the presence of the above catalyst. The functional acyclic olefin can serve as the Lewis base. The ratios of the three catalyst components are in the range of from about 1.0:0.1:0.1 to about 1.0:20:1000. In reaction (B) the acyclic olefin containing a functional group is also a chain terminating agent. Product molecular weight is controlled by the molar ratio of the cyclic olefin reactant and the functional olefin reactant in reaction (B). The molar ratios of the two reactants are in the range of from about 1:1 to 10,000:1, cyclic olefin to functional acyclic olefin. A low molar ratio yields lower molecular weight products, while a higher ratio yields higher molecular weight products.

The above olefin metathesis processes for preparation of monofunctional precursor compounds and telechelic difunctional unsaturated polyolefins wherein the functional groups are reactive terminal groups and the average functionality of the difunctional olefinic compounds is 2.0, as determined by NMR, are especially suited for preparation of linear polyolefins with unique characteristics for preparation of high density polymers with desirable properties.

Accordingly, the instant invention utilizes a metathesis reaction between acyclic olefins which may be the same or different olefins to prepare an acyclic functional olefin, and a metathesis reaction between an acyclic difunctional olefin produced thereby and a cyclic olefin, the reactions being in two steps, i.e., olefins possessing functional groups are metathesized to yield a mono- or difunctional olefin which is metathesized in a second step with a cyclic olefin to yield a difunctional linear polyolefin. The olefin possessing a functional group also can be prepared by metathesis reaction of a cyclic olefin of up to 30 carbon atoms with a monofunctional olefin such as methyl methacrylate, or methyl acrylate, or methyl undecylenate, or allyl acetate.

The process to prepare the polyolefins of the instant invention therefore comprises a metathesis reaction of a linear olefinic hydrocarbon of up to 30 carbon atoms with a functional olefin and a ring-opening metathesis reaction of a cyclic olefin in the presence of a functional olefin at a temperature of from about 0° C. to about 200° C. and a pressure from about $1 \times 10^{-6}$ mm Hg to about 30 atmospheres.

The reactions used to prepare the telechelic linear non-crosslinked polyolefins are the following:

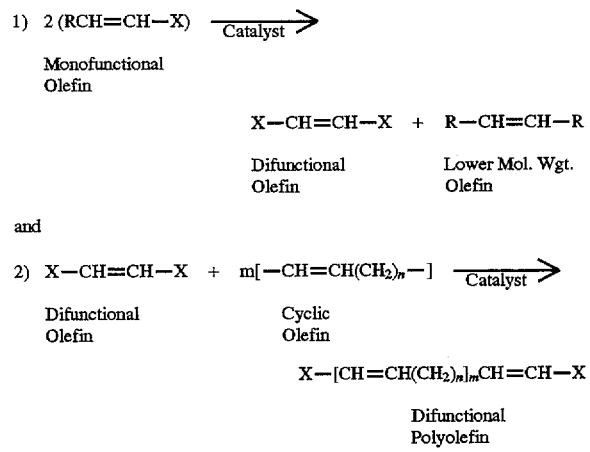

wherein n is a number from 1 to 10 and m is a number average value of up to 1000, R is hydrogen or an alkyl group of from 1 to 8 carbon atoms, X is —COOR', —CH$_2$OC(O)R', or —(CH$_2$)$_8$COOR', and R' is an alkyl group of 1 to 8 carbon atoms.

The process reactions can be performed sequentially, including the preparation of the precursor compounds, with or without isolation and with purification of the products of each step. If desired, the same reaction vessel can be employed for both reactions. All reactions should be liquid phase reactions, using neat liquid reactants, solvents, or diluents.

The process utilizes a catalyst composition comprising (a) a transition metal chloride, oxyhalide, oxide or ammonium salt, (b) an organic tin compound or aluminum halide reagent, and (c) an organic Lewis base wherein undesired side reactions such as double bond migration are minimized.

As the transition metal catalyst component, (a), there can be mentioned halides, oxyhalides, oxides and organic ammonium salts, preferably of tungsten, ruthenium, molybdenum, rhenium and tantalum. As preferred examples, there can be mentioned tungsten compounds such as tungsten hexachloride, tungsten oxytetrachloride, tungsten oxide, tridodecylammonium tungstate, methyltricaprylammonium tungstate, tri(tridecyl)ammonium tungstate and trioctylammonium tungstate, molybdenum compounds such as molybdenum pentachloride, molybdenum oxytrichloride, tridecylammonium molybdate, methyltricaprylammonium molybdate, tri(tridecyl)ammonium molybdate and trioctylammonium molydate, rhenium compounds such as rhenium pentachloride, rhenium oxide, rhenium oxide supported on an oxide such as alumina, silica, or silica-alumina, rhenium oxide together with a promoter such as boron oxide on an oxide support, and tantalum compounds such as tantalum pentachloride.

Organic tin compounds, alkylaluminum halides, alkoxy-alkylaluminum halides and aryloxy-alkylaluminum halides can be used as the activator (b). As preferred examples, there can be mentioned tetrabutyltin, tetramethyltin, tetraethyltin, tetraoctyltin, tetraphenyltin, ethylaluminum dichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, and precondensates of alkylaluminum halides with alcohols.

The Lewis base (c) useful as a catalyst component includes linear functional olefins having at least one functional terminal reactive group as a reactant in reaction (A), ethers, esters, nitriles, ketones, amides, amines, alkynes, phosphorus compounds, and alcohols, of up to 30 carbon atoms. Examples are alkyl and aryl acetates, alkyl acrylates, alkyl methacrylates, alkyl undecylenates, acetonitrile, benzonitriles, acrylonitriles, acetylacetone, tetrahydrofuran, pyridine, N,N'-dimethylformamide, thiophene, ethyl ether, propyl ethers, diphenyl ether, triethylamine, phenylacetylene, organic phosphorus compounds of from 1 to 30 carbon atoms and monohydric and dihydric alcohols of from 1 to 30 carbon atoms such as methyl alcohol, ethyl alcohol, n-propyl alcohol, isopropyl alcohol, n-butyl alcohol, isobutyl alcohol, tert-butyl alcohol, n-pentyl alcohol, isopentyl alcohol, 2-methyl-1-butyl alcohol, 2-methyl-2-butyl alcohol, n-hexyl alcohol, n-heptyl alcohol, n-octyl alcohol, isooctyl alcohol, 2-ethylhexyl alcohol, n-nonyl alcohol, n-decyl alcohol, 1,5-pentanediol, 1,6-hexanediol, allyl alcohol, crotyl alcohol, 3-hexene-1-ol, citronellol, cyclopentanol, cyclohexanol, salicyl alcohol, benzyl alcohol, phenethyl alcohol, cinnamyl alcohol, and the like. The Lewis base (c) is preferably an ester, such as an alkyl acetate, instead of an alcohol. A nitrile such as acetonitrile is preferable to pyridine.

The functionalized olefin useful as a catalyst component having at least one functional reactive group contains at least one or more reactive moiety selected from the group consisting of a nitrile, ester, acyl halide, ketone, aldehyde, borane, acid anhydride, ether, amide, imide, halogen atom, alkene, alkyne, alkyl and aryl moiety, and substituted aryl moieties of up to 30 carbon atoms containing at least one reactive substituent. Suitable functional olefins for use in the process of the instant invention as a catalyst component include methyl acrylate, methyl methacrylate, methyl undecylenate, methyl or ethyl 2,4-hexadienoate, ethyl cinnamate, 4-penten-1-yl acetate, methyl or ethyl vinylacetate, isobutyl vinylacetate, cyclohexyl vinylacetate, phenyl vinylacetate, methyl or ethyl 4-pentenoate, amyl 4-pentenoate, benzyl 4-pentenoate, propyl 3-decenoate, methyl 10-undecenoate, ethyl 10-undecenoate, methyl oleate, ethyl oleate, butyl oleate, methyl isooleate, ethyl 6-octadecenoate, butyl 6-ocatdecenoate, ethyl elaidate, butyl elaidate, methyl brassidate, methyl linolate, diethyl 2-allylmalonate, allyl acetate, oleyl acetate, 3-hexenyl acetate, oleyl oleate, 2-hexenyl 2-methylpropionate, 3-hexenyl valerate, 2-hexenyl acetate, allyl propionate, oleyl benzoate, 9-octadecenenitrile, 6-octadecenenitrile, 3-butenenitrile, 1,4-dicyano-2-butene, 4-pentenenitrile, octadecenedinitrile, 9,12-octadecadienenitrile, 9-decenenitrile, 10-undecenenitrile, 9-octadecenyl ethyl ether, 9-octadecenyl isopropropyl ether, crotyl isopropyl ether, trimethylaliyloxysilane, allylanisole, allyl phenyl ether, 8-heptadecenyl ethyl ketone, 5-heptadecenyl ethyl ketone, 5-hexen-2-one, 6-methyl-5-hepten-2-one, N,N-diethyloleamide N,N-diethylvinylacetamide, alkyl acrylates, alkyl methacrylates, alkyl undecylenates, 3-buten-1-yl acetate, vinyl acetate, alkyl sorbates, and 1,4-diacetoxy-2-butene.

In general, any cyclic olefin of from 4 to about 30 carbon atoms can be utilized in the presence of a functionalized olefin to prepare the olefinic compounds of this invention. The cyclic olefins include both mono- and polycyclic unsaturated hydrocarbon compounds. Representative examples of polycyclic unsaturated hydrocarbon compounds include norbornene, norbornadiene, 2,2,2-bicyclooctene-2, dicyclopentadiene and the like.

The preferred unsaturated alicyclic compounds are those comprising a single unsaturated alicyclic ring. These alicyclic rings may be mono- or multi-substituted by such groups as alkyl, aryl, arylalkyl, and halogen groups.

Representative examples of unsaturated alicyclic compounds containing a single alicyclic ring having at least 4 and not more than 5 carbon atoms in the cyclic ring and containing one double bond in said ring are cyclobutene and cyclopentene. Representative examples of unsaturated alicyclic compounds containing at least seven carbon atoms in the cyclic ring and containing one or more non-conjugated carbon-to-carbon double bonds in the cyclic ring include cyclooctene; 1,4- and 1,5-cyclooctadiene; 1,4,7-cyclononatriene, cyclodecene, cyclododecene, 1,4-, 1,5- and 1,6-cyclodecadiene: 1,4-, 1,5-, 1,6- and 1,7-cyclododecadiene; 1,4,7- and 1,5,9-cyclododecatriene and the like.

The most preferred unsaturated alicyclic compounds of this invention are those containing from one to three carbon-to-carbon double bonds in the ring and in which the double bonds are located in relation to each other in a manner that they are not adjacent and are non-conjugated. Representative examples of such preferred materials are cyclobutene, cyclopentene, cyclooctene, cyclododecene, and 1,5-cyclooctadiene, 1,5,9-cyclododecatriene and 1,9,17-cyclotetracosatriene.

Representative examples of substituted alicyclic compounds are alkyl-substituted compounds such as 1-methyl-1,5-cyclooctadiene; aryl-substituted compounds such as 3-phenyl-1-cyclooctene: aralkyl-substituted compounds such as 3-benzyl-1-cyclooctene; alkaryl-substituted compounds such as 3-tolyl-1-cyclooctene and halogen-substituted compounds such as a 5-chloro-1-cyclooctene, 1-chloro-1,5-cyclooctadiene; 5-chloro-1-cyclododecene and 5,6-dichloro-1-cyclooctene. Mixtures of the unsaturated alicyclic compounds are suitable, including both substituted unsaturated alicyclic compounds and the unsubstituted unsaturated alicyclic compounds.

The metathesis catalyst comprising (a), the transition metal compound, is used in an amount of about 0.01 to about 50 millimoles, preferably 0.1 to 10 millimoles, of metal per mole of the olefin reactant. The activator (b) is used at a molar ratio of from 0.001 to 200:1 preferably from about 0.1 to about 10, per mole of the catalyst component (a). The organic Lewis base is used at a molar ratio of from about 0.1:1 to about 10,000:1 moles, preferably from about 1:1 to about 100:1 per mole of the catalyst component (a).

Preferably both the metathesis catalyst and the activator are used when dissolved or suspended in the reactants, but the catalyst and activator can be used when suspended or dissolved in a small amount of a solvent, as long as the properties of the product are not substantially degraded. Preferred solvents are benzene, toluene, xylene, pentane, hexane, heptane, cyclohexane, methylcyclohexane, chlorobenzene, dichlorobenzene, and mixtures thereof.

Any reagent for deactivating the activator or the metathesis catalyst system, for example, an alkylaluminum chloride, or the catalyst component of the metathesis catalyst system, for example, a tungsten compound catalyst or a molybdenum compound catalyst, can be used as the stopper for the reaction. As preferred examples, there can be mentioned alcohols such as methanol, ethanol, n-propyl alcohol and n-butanol, amines such as ammonia, organic acids such as acetic acid and propionic acid, oxygen, carbon dioxide, and water.

If an appropriate amount of an alcohol is used as the stopper for the reaction, only the activator such as an aluminum compound is deactivated but the catalyst component such as a molybdenum catalyst is left in the liquid product in a reusable state. Of course, a stopper capable of deactivating both of the activator and the catalyst component can be used. In the reaction, the metathesis catalyst component is used in an amount of 0.01 to 50 millimoles, preferably 0.1 to 10 millimoles, per mole of the monomers as a whole. The activator (is used at a molar ratio of from 0.01 to 200, preferably from 1 to 10, to the catalyst component. It is sufficient if the stopper for the reaction is used in an amount enough to deactivate the catalyst system. The amount differs according to the kind of the activator or the catalyst component, but the amount can be easily determined by preliminary experiments. For example, where a dialkylaluminum halide is used as the activator and an alcohol is used as the stopper for the viscosity-increasing reaction, it is sufficient if the alcohol is used in an amount of at least 2 moles per mole of the activator.

The metathesis reaction is preferably performed in liquid phase, with catalyst components dissolved or suspended in a solvent or liquid olefin reactant. Reaction temperatures are preferably from about 0° C. to 200° C. Pressure can be in the range of from about $1\times10^{-6}$ mm Hg to about 30 atmospheres, preferably from about $1\times10^{-6}$ mm Hg to about 1 atmosphere. Any light olefin coproduct (ethylene in the case of polyene reactants with terminal carbon-to-carbon double bonds) is removed efficiently to drive the reaction to high conversion and to eliminate any reactions to form vinyl end-groups.

In the practice of this invention, the catalyst composition preferably comprises a tungsten metal chloride, a tetraalkyltin reagent and an organic Lewis base selected from the group consisting of the functional olefin reactant, an alkyl acetate, a nitrile, and an ether. Inasmuch as the tungsten catalyst in the presence of an activator such as a tetraalkyltin compound, in the absence of a Lewis base, can catalyze side reactions in a metathesis reaction of an olefin compound, a sequence of mixing the components of the catalyst system is preferred.

The tungsten compound is preferably suspended or dissolved in a small amount of a suitable solvent, preferably in an olefin monomer if the tungsten compound is soluble in the monomer. An alcoholic or phenolic compound is also suitable, phenolic compounds being preferred over an alcoholic compound. Suitable phenolic compounds include phenol, alkyl phenols, and halogenated phenols, with tert-butyl phenol, tert-octyl phenol and nonyl phenol most preferred. The preferred molar ratio of the tungsten compound/phenolic compound is from about 1:1 to about 1:3. The tungsten compound/phenolic compound solution can be prepared by adding the phenolic compound to the tungsten compound, stirring the solution and then blowing a stream of a dry inert gas through the solution to remove any hydrogen chloride.

The addition of the Lewis base or a chelating agent can be in an amount of from about 0.1 to about 10,000 moles of Lewis base or chelating agent per mole of tungsten compound. Preferred chelants include acetylacetone and alkyl acetoacetates where the alkyl group contains from 1 to 10 carbon atoms. Preferred Lewis bases include nitriles, ethers and esters such as alkyl acetates, benzonitrile, acetonitrile, tetrahydrofuran.

In metathesis reactions, wherein one of the reactants is an acyclic hydrocarbon olefin, one of the products of the metathesis reaction is an olefin of a lower molecular weight than the starting reactant. In the instant process, it has been found that removal of the olefin of the lower molecular weight is essential to obtain high reaction conversion and to obtain a difunctional product with a functionality number of 2.0. This is accomplished by suitable means such as purging the reaction vessel with inert gas, by crystallization, by evaporation through applying a low or high vacuum to the system, or by any combination of these methods during the reaction, the said steps being in any sequence. The inert gas can comprise nitrogen, the low vacuum from about 1 mm Hg to about 400 mm Hg, and the high vacuum to about $1 \times 10^{-6}$ mm Hg.

Color bodies comprising catalyst residue, measured as the presence of tungsten in parts per million (ppm) can impart a color, which may be unacceptable, to polyolefins prepared by the process of the metathesis reactions using a catalyst comprising a tungsten metal chloride, a tetraalkyltin reagent and an organic Lewis base. Despite treatment and filtration of the polyolefinic product with paper and fiber glass filtration procedures or treatment with diatomaceous earth to remove particulate matter, the filtered and treated polyolefin product can retain an unacceptable color which is typically a yellow to a dark orange yellow variable color of amber hue. It has been found that reduction of the presence of tungsten to less than 100 ppm, as measured by inductively coupled plasma spectroscopy (ICP), results in a polyolefin free of a predominant color. This may be accomplished by suitable means such as treatment of the color-containing polyolefin in a suitable solvent with activated charcoal. The treatment with activated charcoal can be at room temperature and can be for an extended period. Any solvent which can dissolve the polyolefin and which can be removed easily by evaporation can be suitable.

Graft copolymers can be prepared by reacting linear non-crosslinked mono functional unsaturated polyolefins with a reactive terminal group wherein the terminal group is an ester moiety with excess vinyl or acrylic monomer to prepare a macromolecule copolymer with a graft-type architecture. Similarly, a block copolymer can be prepared by reacting linear non-crosslinked difunctional unsaturated polyolefins with reactive terminal groups in a block-type architecture wherein the terminal groups are ester moieties with excess unsaturated monomer such as styrene, isoprene, and butadiene.

Preparation of difunctional telechelic linear non-crosslinked polyolefins of the structure X—[CH=CH(CH$_2$)$_n$]$_m$CH=CH—X wherein X is selected from the group consisting of hydroxyl and amine moieties such as —CH$_2$OH, —(CH$_2$)$_8$COO(CH$_2$)$_p$OH, —COO(CH$_2$)$_p$OH, —(CH$_2$)$_8$C(O)NR'(CH$_2$)$_p$NHR' and —C(O)NR'(CH$_2$)$_p$NHR' wherein p is 2 to 12, R' is hydrogen or an alkyl group of from 1 to 8 carbon atoms, n is 1 to 10, and m is a number average value of up to 1000, are by conventional reactions from polyolefin compounds wherein X is initially an ester group such as an acrylate group, a methacrylate group, an undecylenate or an acetate group. For example, preparation of polyurethane polymers, high molecular weight polyester polymers, polyamide polymers and polyurea polymers from the ester-terminated polymers are prepared by procedures well-known in the prior art including well-known catalysts. The following procedures and catalysts are illustrative.

Dialcohol polyolefins suitable for preparation of linear segmented polyurethanes of thermoplastic characteristics can be prepared by reacting linear non-crosslinked difunctional unsaturated diester oligomers with reactive terminal groups in a hydrolysis or transesterification reaction wherein each terminal group is the same ester moiety with a large excess of water or a suitable alcohol of from 1 to 30 carbon atoms, preferably methanol, ethanol, butanol, 1,6-hexanediol, 1,4-butanediol, 1,2-ethanediol, to end-cap the diester with a terminal alcohol moiety, at a temperature within the range of from about 100° C. to about 250° C. and a pressure of from atmospheric to about 0.005 mm Hg. Mole ratio of diester to alcohol can be in the range of from at least 1:5 to 1:1000, preferably from about 1:5 to about 1:50 to reduce the physical volume of the required reactants. The transesterification catalyst can be selected from the group consisting of titanium (IV) butoxide, titanium (IV) propoxide, dibutyltin dilaurate, tin octoate and other catalysts well-known as useful for a transesterification reaction. Preparation of a difunctional diamine linear telechelic unsaturated polyolefin can be by reaction of said linear telechelic difunctional polyolefin containing ester moieties with a stoichiometric molar excess of up to 1000:1 of a linear diamine of from 1 to 30 carbon atoms in an amination reaction in the presence of an amination catalyst at a temperature within the range of from about 100° C. to about 250° C. at a pressure of from 0.005 mm Hg to about 30 atmospheres. The linear diamine is preferably selected from the group consisting of 1,2-ethanediamine, 1,4-butanediamine, and 1,6-hexanediamine. The amination catalyst can be selected from the groups consisting of protic acids such as sulfuric acid.

Accordingly, the instant invention relates to a novel class of difunctional telechelic non-crosslinked linear unsaturated polyolefins with reactive terminal moieties of the structure X—[CH=CH(CH$_2$)$_n$]$_m$CH=CH—X wherein X is selected from the group consisting of an ester moiety, a hydroxyl moiety, and an amine moiety, the ester moieties consisting of —COOR, —(CH$_2$)$_8$COOR, —CH$_2$OC(O)R, wherein R is an alkyl group of 1 to 8 carbon atoms, the hydroxyl moieties consisting of —CH$_2$OH, (CH$_2$)$_8$COO(CH$_2$)$_p$OH, —COO(CH$_2$)$_p$OH, and the amine moieties consisting of —(CH$_2$)$_8$C(O)NR'(CH$_2$)$_p$NHR' and —C(O)NR'(CH$_2$)$_p$NHR', wherein p is 2 to 12, R' is hydrogen or an alkyl group of 1 to 8 carbon atoms, n is 1 to 10, and m is a number average value of up to 1000, and to an olefin metathesis process for preparing non-crosslinked linear difunctional telechelic compounds of the above structure. When X is an ester moiety as defined above, said process comprises two reactions, the first reaction (A) comprising an olefin metathesis reaction of acyclic olefins characterized as containing one functional group comprising an ester moiety to prepare a linear mono- or difunctional olefinic product, having at least one functional terminal reactive ester moiety, the second reaction (B) comprising a ring-opening polymerization of a cyclic olefin of from about 4 to 30 carbon atoms in the presence of a linear functional olefin having at least one functional terminal reactive ester moiety selected from the group consisting of the product of reaction (A), methyl acrylate, methyl methacrylate, and 1,4-diacetoxy-2-butene wherein said reactions (A) and (B) are metathesis reactions in the presence of a catalyst composition comprising (a) a transition metal compound selected from the group consisting of halides, oxyhalides, oxides and organic ammonium salts, preferably of tungsten, ruthenium, molybdenum, rhenium or tantalum; an activator (b) selected from the group consisting of organic tin compounds, alkylaluminum halides, alkoxyalkylaluminum halides and aryloxyalkylaluminum halides; and an organic Lewis base (c) selected from the group consisting of esters, ethers and nitriles of up to 30 carbon atoms, and other organic Lewis bases, preferably comprising alkyl acetates, acetonitrile, acetylacetone, tetrahydrofuran, pyridine, N,N'-dimethylformamide, thiophene, diphenylether, triethylamine, and organic phosphorus compounds, wherein said catalyst (a) is present in an amount of from about 0.01 to about 50 millimoles metal per mole of said reactants, activator (b) is present in a molar ratio to metathesis catalyst (a) of from about 0.001:1 to about 200:1, and organic Lewis base (c) is present in a molar ratio to metathesis catalyst (a) of from about 0.1:1 to about 10,000:1. Low molecular weight co-product ethylenic compounds are removed from each reaction (A) and (B) after each reaction. The acyclic olefin can be selected from the group consisting of olefinic compounds of up to about 30 carbon atoms. The difunctional telechelic linear polyolefins wherein X is a hydroxyl moiety as defined above or an amine moiety as defined above are prepared by conventional hydrolysis, alcoholysis or amination reactions from the difunctional telechelic linear polyolefins wherein X is an ester moiety.

The following examples are exemplary only and are not to be construed as limiting the scope of this invention.

EXAMPLE 1

The following illustrates the preparation of a functional polyolefin from a cyclic olefin, 1,5-cyclooctadiene, and an ester, methyl methacrylate. Ethylenic co-products of the reaction were not removed from the reaction causing the production of a product with vinyl end-groups.

A 200-cc Fisher-Porter bottle was charged with the following in this order under nitrogen atmosphere: 35 mL chlorobenzene, 15.0 mL 1,5-cyclooctadiene (122 mmol), 3.75 mL methyl methacrylate (35 mmol), 0.56 mL propyl acetate (4.9 mmol), 0.48 g tungsten hexachloride (1.2 mmol, Aldrich Chemical Co., Milwaukee, Wis., 99.9%), and 0.34 mL tetramethyltin (2.4 mmol). The mixture was magnetically stirred at room temperature for several minutes, then heated to 80° C. The solution was stirred at 80° C. for 24 hours. GC analysis indicated complete (>99%) conversion of the 1,5-cyclooctadiene and approximately 20% conversion of the methyl methacrylate at this point. The reaction was terminated by addition of 50 mL 1N sodium hydroxide solution and vigorously stirred for about 5 hours at 80° C. The organic layer was then separated from the aqueous phase, washed with water, dried with magnesium sulfate, and stripped of solvent and remaining methyl methacrylate by rotary evaporation. A pale yellow, moderately viscous liquid product was obtained (10 grams, labelled Sample No. 15685-106-1). Nuclear magnetic resonance analysis (NMR) showed no remaining solvent or methyl methacrylate.

Molecular weight of the product was determined by gel permeation chromotography (GPC), number average molecular weight (Mn)=1290, weight average molecular weight (Mw)=2921 and the vapor pressure osmometry (VPO) (Mn=1162), indicated the product to be oligomeric. Infrared (IR) analysis of the product showed a strong carbonyl absorption at ~1725 wavenumbers, attributed to ester (methacrylic) endgroups, a moderate intensity C=C double bond absorption at 1640–1670, and a moderate intensity band at 910 attributed to vinyl endgroups.

A quantitative C-13 NMR analysis was performed of the product dissolved in chloroform-d with chromium acetylacetonate added as a relaxation agent. The spectrum was similar to that of 1,4-polybutadiene with the addition of weak resonances associated with vinyl and methyl methacrylic endgroups. Strong resonances were observed in the 128–132 ppm range, assigned as internal olefinic carbons of the oligomer backbone: $(-CH_2-CH=CH-CH_2-)_n$. Strong singlet resonances were observed at 33 ppm and 27.5 ppm in an approximate ratio of 2:1, assigned to methylene carbons adjacent to trans and cis internal backbone C=C double bonds, respectively. The relative integration of the backbone internal olefinic carbon and methylene carbon was about 1:1, as expected for 1,4-polybutadiene.

The NMR spectrum was consistent with two types of polyolefin endgroups: $-CH=CH_2$ (vinyl) and $-CH=C(CH_3)CO_2CH_3$ (methyl methacrylic). Weak singlet resonances of approximately equal intensity were observed at 168.2 ppm (carbonyl carbon of methyl methacrylic endgroup), 141.6 and 127.6 ppm (olefinic carbons of methyl methacrylic endgroup), 138.2 and 114.5 ppm (vinyl endgroup carbons), 51.5 ppm (methoxy carbon of methyl methacrylic) and 12.4 ppm (allylic methyl of methyl methacrylic). (A NMR spectrum of a similar sample, 15685-172-1, indicated the 141.6 ppm resonance to be a CH, assigned as the CH olefinic carbon of the methyl methacrylic endgroup, and the 127.6 ppm peak to be a carbon with no attached hydrogens, assigned as the other methacrylic olefinic carbon). The integration of each of these endgroup resonances was about 1.5% of the total integration of internal backbond olefinic carbon (128–132 ppm). No other endgroup types were discernible, and no other resonances were detected between 0 and 25 ppm, indicating a lack of any other methyl carbons besides that of the methyl methacrylic endgroup.

In summary, the spectroscopic and molecular weight data are consistent with a polyolefin product having a 1,4-polybutadiene structure with ester (methyl methacrylic) and vinyl endgroups. Polydispersity was 2.3.

EXAMPLE 2

The following illustrates the preparation of a functional oligomer from a cyclic olefin, 1,5-cyclooctadiene, and an ester, methyl acrylate.

The same procedure was performed as in Example 1 except that methyl acrylate (3.15 mL, 35 mmol) was employed instead of methyl methacrylate. GC analysis after 24 hours at 80° C. indicated 30% conversion of 1,5-cyclooctadiene and 19% conversion of methyl acrylate. Work-up (including rotary evaporation of solvent and remaining olefin reactants) yielded 3.3 g of a very pale yellow, clear, oily liquid (Sample No. 15685-142-2). IR analysis of the product showed a strong carbonyl absorption at ~1735 wavenumbers, attributed to ester (acrylic) endgroups, a moderate intensity C=C double bond absorption at 1640–1670, and a moderate intensity band at 910 attributed to vinyl endgroups.

Quantitative C-13 NMR analysis showed features similar to the product in Example 1, with methyl acrylic endgroup resonances instead of methyl methacrylic. The 1,4-polybutadiene backbone structure was observed, with a 0.3 trans/cis C=C double bond ratio (backbone internal double bonds). The relative integration of the backbone internal olefinic carbon and methylene carbon was about 1:1, as expected for 1,4-polybutadiene.

The NMR spectrum was consistent with two types of oligomer endgroups: $-CH=CH_2$ (vinyl) and —CH=CH—CO$_2$CH$_3$ (methyl acrylic). Weak singlet resonances of similar intensity were observed at 166.7 ppm (carbonyl carbon of methyl acrylic endgroup), 148.6 and 121.1 ppm (olefinic carbons of methyl acrylic endgroup), 148.6 and 121.1 ppm (olefinic carbons of methyl acrylic endgroup), 138.2 and 114.5 ppm (vinyl endgroup carbons), and 51.3 ppm (methoxy carbon of methyl acrylic). The integration of each of the methyl acrylic endgroup resonances was about 0.9% of the total integration of internal backbone olefinic carbon (128–132 ppm), while the integration of each of the two vinyl endgroup resonances was about 1.25%. No other endgroup types were discernible, and no resonances were detected between 0 and 25 ppm, indicating a lack of methyl carbons other than the methoxy.

In summary, the spectroscopic and molecular weight data are consistent with an oligomeric product having a 1,4-polybutadiene structure with ester (methyl acrylic) and vinyl endgroups. No chain branching carbon atoms were evidenced in the NMR.

EXAMPLE 3

The following illustrates the preparation of a telechelic difunctional oligomer with a two step process from a cyclic olefin, 1,5-cyclooctadiene, and an ester, methyl methacrylate.

1,2-Dichlorobenzene solvent (Aldrich Chemical Co., Milwaukee, Wis., HPLC grade) was purified by passage through a column of silica gel and 13X sieves, and stored over 4A sieves. Hexyl acetate and tetramethyltin were dried over 4A sieves. 1,5-Cyclooctadiene (Aldrich, 99+%) was stored over 4A sieves. Methyl methacrylate (Aldrich) was used as obtained without removal of inhibitor. Tungsten hexachloride (99.9%) was obtained from Aldrich, used as obtained, and stored under nitrogen.

The reaction vessel consisted of a 250-mL three-neck round-bottom glass flask (with magnetic stirbar) fitted with a water-cooled reflux condenser (on the center neck) and stopcock adapters (on outer necks). Prior to introduction of reagents, the apparatus was purged with a rapid flow of nitrogen (inlet at a flask neck and outlet through the condenser). The three-neck round-bottom flask was immersed in a constant-temperature oil bath for heating.

The following were added to a round-bottom flask under nitrogen at room temperature: 1,2-dichlorobenzene (35 mL), methyl methacrylate (13.0 mL, 122 mmol), 1,5-cyclooctadiene (15.0 mL, 122 mmol), hexyl acetate (1.60 mL, 9.7 mmol), tungsten hexachloride (0.97 g, 2.44 mmol), and tetramethyltin (0.68 mL, 4.9 mmol). The solution was stirred well to fully dissolve the tungsten hexachloride, and was then cannula-transferred to the above-described reaction vessel under nitrogen. The reaction vessel was heated to 80 deg C. The solution was stirred at 80 deg C. for 5 hours under static nitrogen atmosphere. (After the 5 hours, cyclooctadiene conversion was estimated to be essentially complete and methyl methacrylate conversion was estimated at 10–15%, by FID GC analysis). After 5 hours, a 1.5-SCFH nitrogen flow through the apparatus was initiated and maintained for the duration of the experiment.

The experiment was continued for a total of 4 days (approximately 96 hrs) at 80 deg C. After approximately 24 hours, GC analysis of the reaction solution indicated no remaining cyclooctadiene or methyl methacrylate. (Most of the methyl methacrylate loss was due to evaporation caused by the high nitrogen flow rate). IR analysis of a sample of the oligomer product at this point showed a strong ester endgroup band (C=O, 1725 wave numbers), but also a moderate-intensity vinyl endgroup band (910 wave numbers) indicating incomplete metathesis of the vinyl endgroups. An addition of fresh catalyst solution (1.60 mL hexyl acetate, 0.97 g tungsten hexachloride, and 0.68 mL tetramethyltin dissolved in 35 mL 1,2-dichlorobenzene) was made to the reaction vessel. IR analyses and additions of fresh catalyst solution were also performed after approximately 48 hours and approximately 72 hours. At the conclusion of the run (approximately 96 hours), IR analysis showed only a very weak vinyl endgroup band remaining in the oligomer product, with a strong carbonyl band (1725 wave numbers).

The reaction solution was cooled to room temperature, and quenched by bubbling dry ammonia gas through the solution for 40 minutes. The black precipitate which was produced by the ammonia treatment was removed by filtration. Solvent was removed from the filtrate by rotary evaporation at 95 deg. C., leaving 10.3 g of a viscous, yellow-orange, cloudy oligomer product (Sample No. 15685-17201). Quantitative C-13 NMR was performed using chloroform-d as solvent with chromium acetylacetonate added as a relaxation agent.

The C-13 NMR spectral data for this product are given in Table I. The spectrum indicates a 1,4-polybutadiene backbone structure for the oligomer, with methyl methacrylic and vinylic endgroups. There was no clear evidence in the NMR analysis for other endgroup types. Assuming acyclic and non-branched chains, the ester (methyl methacrylic endgroup) functionality was estimated at Fn=1.7 (85% ester endgroups, 15% vinyl endgroups). The trans/cis ratio of C—C bonds in the 1,4-polybutadiene backbone was about 3:1. Mn was estimated at 1200–1600. No poly(methyl methacrylate) was detected in the NMR. However, a broad underlying resonance of significant area was seen in the sp3 carbon region (10–54 ppm), assigned as "detrital carbon" CH$_2$ and CH species. Since the specific character of this "detrital" material is not clear, the functionality number (Fn) calculated above is only an approximation.

TABLE I

| Chemical Shift (ppm,d) | Relative Integration | Assignment |
| --- | --- | --- |
| 128–132 (m) | 350 | Internal Olefinic carbons (backbone) |
| 168.4 (s) | 17.7 | C=O of methyl methacrylic endgroup |
| 141.9 (s) | 15.7 | =CHR of methyl methacrylic endgroup |
| 127.9 (s) | 16.3 | =CRMe of methyl methacrylic endgroup |
| 51.7 (s) | 18.4 | OCH$_3$ of methyl methacrylic endgroup |
| 12.6 (s) | 17.2 | allylic —CH$_3$ of methacrylic endgroup |
| 138.2 (s) | 2.6 | =CHR of vinylic endgroup |
| 114.5 (s) | 2.6 | =CH$_2$ of vinylic endgroup |
| 32.9 (s) | 222 | CH$_2$ adjacent to trans —C=C— (backbone) |
| 27.6 (s) | 60 | CH$_2$ adjacent to cis —C=C— (backbone) |
| 27–33**a | 110 | Other CH$_2$ resonances |
| 10–54 (br)**b | 154 | Detrital sp3 C |

**a A number of small singlet resonances, some overlapping, assigned as CH$_2$s; primarily CH$_2$s alpha and beta to endgroups.
**b Very broad, underlying resonance, primarily sp3 CH$_2$ and sp3 CH with little CH$_3$.

EXAMPLE 4

The following illustrates the preparation of a telechelic difunctional oligomer with a two-step process from an acyclic olefin and a cyclic olefin. Low molecular weight ethylenic co-products were removed by rotary evaporation and crystallization.

Chlorobenzene (Aldrich Chemical Co., Milwaukee, Wis., HPLC grade was purified by passage through a column of silica gel and 13X sieves, and stored over 4A sieves. Tetramethyltin (Aldrich, 99+%) was dried over 4A sieves. Tungsten hexachloride (Aldrich, 99.9+%) was used as obtained. Methyl undecylenate (methyl 10-undecenoate, 97%) was obtained from Elf Atochem, Philadelphia, Pa., and purified by treatment with aqueous NaOH and water followed by drying (with magnesium sulfate) and vacuum distillation; the purified material was stored over 4A sieves. 1,5-Cyclooctadiene (Aldrich, 99.3%) was fractionally distilled using a 20-tray Oldershaw column at a reflux ratio of 15:1. The distilled product was determined to be 99.9% pure by gas chromatography, containing less than 0.01% 4-vinyl-1-cyclohexene. The distilled cyclooctadiene was further purified by passage through a column of basic activated alumina LaRoche Chemicals A-204-4, LaRoche Chemicals, Baton Rouge, La., then stored over 4A sieves under nitrogen.

Process Step (1):

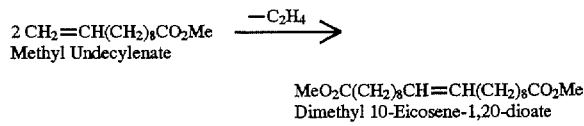

Tungsten hexachloride (3.2 g, 8.0 mmol) was dissolved in methyl undecylenate (90 mL, 400 mmol) under nitrogen. The solution was syringed into a 500 mL flask with attached reflux condenser which had been purged with nitrogen and preheated to 50 deg C. using an oil bath. After 30 minutes, tetramethyltin (2.2 mL, 16 mmol) was syringed into the solution and the temperature was raised to 75 deg C. The solution was stirred at 75 deg C. for 19 hours under a slow flow of nitrogen, then cooled to room temperature. Dry gaseous ammonia was bubbled through the solution for 30–40 minutes to quench the reaction. Hexane was added to the solution, and precipitated catalyst residue was removed by filtration. The filtrate was then subjected to rotary evaporation at 90–150 deg C. using a mechanical vacuum pump to remove hexane and unreacted methyl undecylenate. Upon cooling, an orange crystalline solid was obtained. It was dissolved in methanol and decolorized by treatment with charcoal. The product was then recrystallized several times from aqueous methanol at 0 deg C., affording 22.3 g (60 mmol) of white, crystalline dimethyl 10-eicosene-1,20-dioate (m.p. 44 deg C.).

Process Step (2)

Reaction of dimethyl 10-eicosene-1,20-dioate with excess 1,5-cyclooctadiene to yield ester-terminated, difunctional 1,4-polybutadiene oligomer.

Under nitrogen, a 250-mL flask was charged with dimethyl 10-eicosene-1,20-dioate (7.0 g, 19 mmol), chlorobenzene (85 mL), 1,5-cyclooctadiene (56.5 mL, 460 mmol), tungsten hexachloride (37 mg, 0.093 mmol), and tetramethyltin (26 uL, 0.19 mmol). The solution was then heated to 100 deg C. and stirred under a nitrogen atmosphere. After 4.5 hours at 100 deg C., additional catalyst solution (37 mg tungsten hexachloride and 26 uL tetramethyltin dissolved in 2 ml chlorobenzene) was syringed into the reaction flask. The solution was then stirred for an additional 17.5 hours (22 hours total) at 100 deg C., then cooled to room temperature. Gas chromatographic analyses indicated 99.9% conversion of 1,5-cyclooctadiene and 87% conversion of dimethyl 10-eicosene-1,20-dioate. Gaseous ammonia was bubbled through the reaction solution for 10 minutes. The solution was degassed and then filtered to remove precipitated catalyst residue. The filtered solution was then subjected to rotary evaporation at 100–110 deg C. using a mechanical vacuum pump to remove volatile liquids, leaving a viscous liquid product. To remove unreacted dimethyl eicosene dioate and very low molecular weight products, the viscous liquid was dissolved in dichloromethane and then precipitated by addition of a large quantity of methanol. The precipitated viscous liquid was collected and washed with additional methanol. The dissolution/precipitation procedure was repeated. The final precipitated (methanol-insoluble) viscous liquid product was clear and pale yellow; yield was 44 g (77% yield based on weight of reactants). No dimethyl 10-eicosene-1,20-dioate was detected by gas chromatography in this product, but it was detected in the methanol washings from the dissolution/precipitation procedure.

A quantitative carbon-13 NMR was performed of the product dissolved in chloroform-d with chromium acetylacetonate added as a relaxation agent. The NMR spectrum was consistent with the following ester-terminated, difunctional 1,4-polybutadiene oligomer structure:

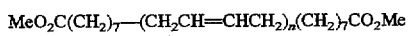

Strong resonances were observed in the spectrum in the 128–132 ppm range, assigned as internal olefinic carbons of a 1,4-polybutadiene backbone: ($-CH_2-CH=CH-CH_2-$)$_n$. Strong singlet resonances were observed at 32.5 ppm and 27.5 ppm in a 59/41 integrated intensity ratio, assigned as methylene carbons adjacent to trans (59%) and cis (41%) internal backbone carbon-carbon double bonds, respectively. The relative intensity of the combined backbone olefinic carbon resonances was equal (to within 1%) to that of the combined adjacent methylene carbon resonances, consistent with a 1,4-polybutadiene structure. The spectrum indicated that the product possessed ester endgroups of the structure $-(CH_2)_7CO_2Me$: weak singlet resonances of equal intensity were observed at 173.5 ppm (carbonyl carbon of the ester), 51.1 ppm (methoxy carbon of ester), 33.8 ppm (methylene carbon alpha to carbonyl), and 24.8 ppm (methylene carbon beta to carbonyl); a broad resonance was observed at 29.1 ppm with 5-fold greater intensity (five methylene carbons). Although the signal-to-noise ratio of the spectrum was very high (about 100:1 for the carbonyl carbon endgroup signal), no other resonances were detected other than sidebands of major peaks. No other endgroup types were detected, such as saturated methyl or ethyl endgroups (10–24 ppm) or vinyl endgroups (110–120 ppm, 132–142 ppm). Neither were vinyl endgroups detected in a proton NMR spectrum of the product. The NMR data thus indicate the acyclic oligomer product to be purely difunctional with respect to ester endgroups (Fn=2.0). No evidence of chain-branching was seen in the NMR.

Number-average molecular weight ($M_n$) of the product was computed at 4,030 g/mole using relative integrated intensities from the carbon-13 NMR spectrum (carbonyl carbon=6.87; methoxy carbon=6.70; combined backbone olefinic carbon=466) and the relation, $M_n=n(54.1)+314.5$, which is based upon the product structure shown above. Polydispersity was 2.4. GPC data was: $M_n=2980$, $M_w=7150$, using polybutadiene calibration standard.

EXAMPLE 5

This example illustrates the effect of the amount of catalyst charge upon difunctional oligomer product purity.

A procedure was followed similar to that of Example 4, except that a greater amount of catalyst (relative to monomer amounts) was employed in the second process step (reaction of dimethyl 10-eicosene-1,20-dioate with 1,5-cyclooctadiene). The molar 1,5-cyclooctadiene/WCl$_6$/SnMe$_4$ ratio employed in this example was 500/1/2 (vs. 2500/1/2 in Example 4). The reaction was terminated after 2.5 hours at 100 deg C., at which point 1,5-cyclooctadiene conversion was 99.9% and dimethyl 10-eicosene-1,20-dioate conversion was 94% as determined by gas chromatography. The viscous liquid oligomer product was isolated by the procedure of Example 4, and analyzed by carbon-13 NMR. The NMR spectrum was similar to that of Example 4 with the addition of two very weak singlet resonances of equal intensity at 138.0 ppm and 114.3 ppm, assigned as the =CHR and =CH$_2$ carbons, respectively, of a vinyl endgroup: RHC=CH$_2$. The integrated intensity of each vinyl endgroup carbon resonance was 1–2% of the intensity of the ester endgroup carbonyl carbon resonance. This indicates that 1–2% of the oligomer endgroups of this product were non-functional (meaning non-ester), and thus the product was not as difunctionally pure as that of Example 4.

Number-average molecular weight of this product was determined to be 3,680 g/mole by vapor pressure osmometry (VPO), and was calculated by carbon-13 NMR to be 3,860 g/mole. Polydispersity was 2.2. GPC data was: $M_n$=2870, $M_w$=6270, using polybutadiene calibration standard.

EXAMPLE 6

This example illustrates the effect of reactant purity, in particular the purity of the cyclic olefin monomer, upon difunctional oligomer product purity.

A procedure was followed similar to that of Example 4, except that the 1,5-cyclooctadiene employed in the second process step was less pure. In this example, 1,5-cyclooctadiene (Aldrich, 99.3% pure by gas chromatographic analysis) was used without further purification by distillation. GC analysis indicated the presence of several organic impurities, including 0.2% 4-vinyl-1-cyclohexene. In this example, the amount of catalyst employed in the second process step was the same as in Example 5: 500/1/2 1,5-cyclooctadiene/WCl$_6$/SnMe$_4$. The reaction was terminated after 4 hours at 100 deg C., at which point 1,5-cyclooctadiene conversion was 99.6% and dimethyl 10-eicosene-1,20-dioate conversion was 85% as determined by gas chromatography. The viscous liquid oligomer product was isolated by the procedure of Example 4, and analyzed by carbon-13 NMR. The NMR spectrum was similar to that of Example 5, except that the two vinyl endgroup carbon resonances (138.0 ppm and 114.3 ppm) were more intense, each with an integrated intensity of 7–8% of the intensity of the ester endgroup carbonyl carbon resonance. This indicates that 7–8% of the oligomer endgroups of this product were vinyl and non-functional (meaning non-ester), and thus the product was less difunctionally pure than that of Example 5. Polydispersity was 1.4. GPC data was: $M_n$=3350, $M_w$=4690, using polybutadiene calibration standard.

EXAMPLE 7

The following illustrates the preparation of ester-functionalized oligomers and polymers by cross-metathesis reaction of an unsaturated polymer, 1,4-polybutadiene, with an ester, methyl methacrylate. The ester-functionalized oligomers prepared are of lower molecular weight. Degradation of the unsaturated polymer by metathesis reaction resulted in cross-linking and a polydispersity over 2.0.

Reagents: A high molecular weight cis-1,4-polybutadiene (Goodyear, Budene 1208, date code BC180891, 98% cis-1, 4, Mn 85,000–95,000, Mw 400,000–420,000) was employed in neat, uncured form. 1,2-Dichlorobenzene, Aldrich HPLC grade, was purified by passage through a column of silica gel and 13X sieves, and stored over 4A sieves. Propyl acetate and tetramethyltin were dried over 4A sieves. Methyl methacrylate (Aldrich, 99%) was used as obtained without removal of inhibitor. Tungsten hexachloride (Aldrich, 99.9+%) was used as obtained.

A 200-cc Fisher-Porter bottle was charged with the following in this order under nitrogen atmosphere: 4.5 g polybutadiene (83 mmol CH$_2$CH=CHCH$_2$— repeat unit), 140 mL 1,2-dichlorobenzene, 2.2 mL methyl methacrylate (21 mmol), 0.38 mL propyl acetate (3.3 mmol), 0.33 g tungsten hexachloride (0.83 mmol), and 0.23 mL tetramethyltin (1.7mmol). The mixture was magnetically stirred at room temperature for several minutes, then heated to 80 deg C. It was noted that the polybutadiene was not entirely dissolved after 3–4 hours at 80 deg C. The solution was stirred at 80 deg C. for a total of 20.5 hours, at which point there was no evidence of undissolved polymer. The solution was cooled to room temperature and the reaction terminated by bubbling dry gaseous ammonia through the solution for 10 minutes. The solution was filtered to remove catalyst residue. Volatile liquids (dichlorobenzene, propyl acetate, and unreacted methyl methacrylate) were removed from the filtered solution by rotary evaporation, leaving a viscous brown liquid product (4.5 g).

The low molecular weight of this product was determined by GPC (Mn=410, Mw=1170). IR analysis of the product showed a carbonyl band at 1717.5 wavenumbers, attributed to ester (methacrylic) endgroups, a weak intensity C=C band at 1640–1670 wavenumbers, and a weak band at 910 wavenumbers attributed to vinyl endgroups. Polydispersity was 2.9.

A quantitative C-13 NMR was performed of the product dissolved in chloroform-d with chromium acetylacetonate added as a relaxation agent. Strong resonances were observed in the 128–132 ppm range, assigned as internal olefinic carbons of the 1,4-polybutadiene backbone: (—CH$_2$CH=CH—CH$_2$—)$_n$. Strong singlet resonances were observed at 32.5 ppm and 27.2 ppm in an approximate ratio of 1:1, assigned to methylene carbons adjacent to trans and cis internal backbone C=C double bonds, respectively. The relative integration of the backbone internal olefinic carbon and methylene carbon was about 1:1, as expected from 1,4-polybutadiene. The spectrum was consistent with two types of endgroups: —CH=CH$_2$ (vinyl) and —CH=C(CH$_3$)CO$_2$CH$_3$ (methyl methacrylic). Weak singlet resonances were observed at 168.1 ppm (carbonyl carbon of methyl methacrylic endgroup), 141.5 ppm (an olefinic carbon of methyl methacrylic endgroup), 138.1 and 114.4 ppm (vinyl endgroup carbons), 51.4 ppm (methoxy carbon of methyl methacrylic) and 12.3 ppm (allylic methyl of methyl methacrylic). The integration of each of the endgroup resonances was in the range of 1–2% of the total integration of internal backbond olefinic carbon (128–132 ppm). Integrated intensities of the vinyl carbon resonances were roughly double those of the methyl methacrylic resonances.

The spectroscopic and molecular weight data indicate the product to consist of low molecular weight 1,4-polybutadiene oligomers and ester (methyl methacrylic) and vinyl endgroups. This is the product of metathesis depolymerization and polymer degradation.

EXAMPLE 8

The following illustrates the preparation of a high molecular weight polyester from polycondensation of a 1,4-polybutadiene alpha, omega-diester and a diol. The preparation demonstrates the difunctionality of a diester prepared by the process of the instant invention and provides evidence for difunctionality in the polyesterification of a polybutadiene diester with a diol.

A telechelic difunctional oligomer prepared as in the process of Example 4 was polyesterified with 1,6-hexanediol. A separate polyesterification reaction was performed with 1,12-dodecanediol. The procedures were as follows:

To a 50 ml round-bottom flask with a nitrogen atmosphere containing 5.00 g (1.39 mmol) of polybutadiene diester (Sample No. 18098-103A), estimated number average molecular weight 3600, IV=0.11 dl/g in 60:40 phenol:1,1,2,2-tetrachloroethane (PTCE), and 0.821 g (6.95 mmol) of 1,6-hexanediol, Aldrich Gold Label, Aldrich Chemical., Milwaukee, Wis., was added 0.02 g (2 drops) of titanium (IV) butoxide (3400 ppm). In a Kugelrohr "thin film" reactor, the mixture was heated to 150° C. at one atmosphere pressure for three hours and then the pressure was reduced to 0.005 mm Hg for an additional three hours.

The resultant polymer (Sample No. 15747-131) was a clear rubbery solid, 5.09g; yield was 99% of theoretical. The IV was 0.76 dl/g in 1,2,4-trichlorobenzene. Number average molecular weight by gel permeation chromatography (GPC) was 64,000 versus polypropylene standard. Solubility in 1,2,4-trichlorobenzene indicated that the polymer was substantially linear.

Verification of the transesterification procedure was made by synthesis of high polymer from other unsaturated aliphatic diesters. A reaction was run in which the polybutadiene diester was replaced by a $C_{20}$-unsaturated aliphatic diester, dimethyl 10-eicocene-1,20-dioate. In a two-step process, a waxy prepolymer intermediate was isolated initially, and subsequently its molecular weight was advanced by heating at 220° C. under vacuum (0.3 mm Hg). This gave a tough, high molecular weight polyester (IV 0.90 dl/g in 60:40 phenol:tetrachloroethane) which was soluble in 1,2,4-trichlorobenzene.

EXAMPLE 9

The following illustrates the preparation of a polymer free of a predominant color and containing less than 100 parts per million of tungsten comprising a methyl ester-terminated difunctional 1,4-polybutadiene polymer prepared in Example 4.

The final precipitated (methanol-insoluble) viscous liquid product, clear and pale yellow in color, 250 g, containing 370 ppm tungsten, analysis by inductively coupled plasma spectroscopy (ICP), of Example 4, was dissolved in dichloromethane, at least 200 ml, in a one-liter Erlenmeyer flask equipped with a stir-bar. Activated carbon, 24 g, 100 mesh (fine), Atlas Chemical Industries, Wilmington, Del., was added to the flask. Total volume in the flask was 650–700 ml. A nitrogen purge for 10 minutes removed air from the flask through the stopper and the flask was sealed. The polymer solution was stirred for approximately 64 hours at room temperature.

After the period of stirring, the polymer solution was filtered through diatomaceous earth under a vacuum of 20 inches Hg to remove the dichloromethane solvent. The viscous polymer free of a predominant color was analyzed by inductively coupled plasma spectroscopy (ICP). Tungsten content was less than 100 ppm.

EXAMPLE 10

The following illustrates the preparation of a low molecular weight oligomer of a difunctional telechelic polybutadiene dialcohol by transesterification of a polybutadiene diester prepared as in Example 4 with an aliphatic dialcohol, 1,6-hexanediol, in a 50-fold stoichiometric excess of 1,6-hexanediol, to prepare oligomers with predominantly one or two polybutadiene units per chain.

To a 1-L flask with a nitrogen atmosphere containing 50.3 g (13.6 mmol) of polybutadiene diester (Sample No. 18098-115A, formula weight 3700) and 79.9 g (676 mmol) of 1,6-hexanediol was added 1.3 g (3.8 mmol) of titanium (IV) butoxide. In a Kugelrohr "thin film" reactor, the mixture was heated to 150° C. for 2 hour, and then to 200° C. for an additional 4 hour to give a yellow suspension. Carbon NMR analysis on the mixture indicated that transesterification was complete; the methyl ester signal (—OCH$_3$) at 51.8 ppm for starting material was replaced by a new signal at 64.5 ppm for hexyl ester.

In the purification step, the addition of 300 ml of diethyl ether to the mixture gave a white suspension which was filtered through a medium glass frit to give 70 g (89% recovery) of 1,6- hexanediol. Then, solvent extraction of the organic filtrate with water removed the water-soluble 1,6-hexanediol, leaving an ether solution of the polybutadiene oligomer. Evaporation of solvent at low temperature (<45° C.) under vacuum gave 44 g (88% yield) of a viscous yellow oil (Sample No. 15747-155.13). Chemical and spectroscopic methods were consistent with the proposed structure. Hydroxyl titration: 0.523 mEq OH/g (Calcd Mn 3824 based on difunctional structure). Carbon NMR: calcd Mn 3862. GPC (vs. polybutadiene standard): Mn 5055, Mw 8968. Polydispersity was 1.8.

EXAMPLE 11

The procedure of Example 10 was repeated with a five-fold excess of 1,6-hexanediol to generate a mixture of alcohol end-capped oligomers with a degree of polymerization of about 1.5, that is, mostly oligomers with either one or two polybutadiene units per chain.

To a 50 ml flask with a nitrogen atmosphere containing 5.00 g (1.35 mmol) of polybutadiene diester (Sample No. 18098-115A, FW 3700) and 0.821 g (6.95 mmol) of 1,6-hexanediol was added 0.2 g (20 drops) of titanium (IV) butoxide (34000 ppm). In a Kugelrohr "thin film" reactor, the mixture was heated to 150° C. for 3 hour to give 5.54 g of orange oily solid. Carbon NMR analysis on the product indicated that transesterification was complete because none of the characteristic methyl ester signal (—OCH$_3$) at 51.8 ppm from starting material was detected; it was replaced by a new signal at 64.5 ppm which is assigned the corresponding methylene carbon of the hexyl ester.

In a second step, purification of the product was effected by selective solvent extraction of the excess 1,6-hexanediol using acetone which is a non-solvent for the polybutadiene oligomer. Solvent extraction can have a distinctive advantage over vacuum distillation as a purification method because it avoids the possibility of heat-induced coupling of the oligomers that might occur in the latter. A single acetone wash of the oily reaction mixture in the same reactor flask accomplished the desired result, i.e., nearly complete removal of the monomeric alcohol by NMR analysis and quantitative recovery of oligomer. As predicted from the reaction stoichiometry, gel permeation chromatography on the product confirmed the presence of some higher homologs (Mn 6500).

That which is claimed is:

1. A difunctional telechelic linear non-crosslinked polyolefin having a functionality number of 2.0, as determined by NMR, polydispersity is from 1.3 to 3.0, and a polyolefin molecular structure:

$$X-(\underset{\underset{Y}{|}}{\overset{\overset{Y}{|}}{C}}=\underset{\underset{Y}{|}}{\overset{\overset{Y}{|}}{C}}-Q)_m-\underset{\underset{Y}{|}}{\overset{\overset{Y}{|}}{C}}=\underset{\underset{Y}{|}}{\overset{\overset{Y}{|}}{C}}-X$$

wherein $$\underset{\underset{Y}{|}}{\overset{\overset{Y}{|}}{C}}=\underset{\underset{Y}{|}}{\overset{\overset{Y}{|}}{C}}-Q$$

is at least one ring-opened olefinic group of a cyclic olefin of from 4 to 30 carbon atoms, Q is selected from the group consisting of hydrocarbon moieties and halogen-substituted hydrocarbon moieties, X is selected from the group consisting of —COOR, —(CH$_2$)$_n$OC(O)R, —(CH$_2$)$_8$COOR, —(CH$_2$)$_n$OH, —(CH$_2$)$_8$COO(CH$_2$)$_p$OH, —COO(CH$_2$)$_p$OH, —(CH$_2$)$_8$C(O)NR'(CH$_2$)$_p$NHR' and —C(O)NR'(CH$_2$)$_p$NHR', wherein Ys are the same or different and are individually selected from the group consisting of hydrogen, halogen, an alkyl group, and an aryl group, wherein p is 2 to 12, wherein R is an alkyl group of from 1 to 8 carbon atoms, R' is selected from the group consisting of hydrogen and an alkyl group of 1 to 8 carbon atoms, n is 1 to 3, and m is a number average value of up to 1000.

2. The polyolefin of claim 1 wherein $$(\underset{\underset{Y}{|}}{\overset{\overset{Y}{|}}{C}}=\underset{\underset{Y}{|}}{\overset{\overset{Y}{|}}{C}}-Q)$$

is at least one ring-opened olefinic group of a cyclic olefin containing from 4 to 30 carbon atoms selected from the group consisting of monocyclic unsaturated hydrocarbon compounds, polycyclic unsaturated hydrocarbon compounds, alicyclic unsaturated hydrocarbon compounds, and mixtures thereof.

3. The alicyclic unsaturated hydrocarbon compounds of claim 2 wherein alicyclic rings of said alicyclic unsaturated hydrocarbon compounds are mono- and multi-substituted with groups selected from the group consisting of alkyl, aryl, arylalkyl and halogen groups.

4. The polyolefin of claim 2 wherein $$(\underset{\underset{Y}{|}}{\overset{\overset{Y}{|}}{C}}=\underset{\underset{Y}{|}}{\overset{\overset{Y}{|}}{C}}-Q)$$

is a ring-opened olefinic group of a cyclic olefin containing from 4 to 30 carbon atoms selected from the group consisting of cycloheptene; 1,3-cyclooctadiene; 1,4-cyclooctadiene; 1,5-cyclooctadiene, norbornene, norbornadiene, 2,2,2-bicyclooctene-2; dicyclopentadiene; cyclooctene; cyclodecene; methyl cyclooctadienes; dimethyl cyclooctadienes; methyl cyclooctenes; dimethyl cyclooctenes; 1,4,7-cyclononatriene; 1,4-cyclodecadiene; 1,5-cyclodecadiene; 1,6-cyclodecadiene; 1,4-cyclododecadiene; 1,5-cyclododecadiene; 1,6-cyclododecadiene; 1,7-cyclododecadiene; 1,4,7-cyclododecatriene; 1,5,9-cyclododecatriene; trimethyl 1,5,9-cyclododecatriene; cyclopentene; cyclododecene; cyclobutene; 1,9,17-cyclotetracosatriene; 1-methyl-1,5-cyclooctadiene; 3-phenyl-1-cyclooctene; 3-benzyl-1-cyclooctene; 3-tolyl-1-cyclooctene; 5-chloro-1-cyclooctene; 1-chloro-1,5-cyclooctadiene; 5-chloro-1-cyclododecene; 5,6-dichloro-1-cyclooctene; and mixtures thereof.

5. The polyolefin of claim 1 which contains two or more different ring-opened olefinic groups.

6. The polyolefin of claim 1 wherein X is —COOR and R is an alkyl group of 1 to 8 carbon atoms.

7. The polyolefin of claim 1 wherein X is —(CH$_2$)$_n$OC(O)R, R is an alkyl group of from 1 to 8 carbon atoms, and n is 1 to 3.

8. The polyolefin of claim 1 wherein X is —(CH$_2$)$_8$COOR and R is an alkyl group of 1 to 8 carbon atoms.

9. The polyolefin of claim 1 wherein X is —(CH$_2$)$_n$OH and n is 1 to 3.

10. The polyolefin of claim 1 wherein X is —(CH$_2$)$_8$COO(CH$_2$)$_p$OH, and p is 2 to 12.

11. The polyolefin of claim 1 wherein X is —COO(CH$_2$)$_p$OH and p is 2 to 12.

12. The polyolefin of claim 1 wherein X is —(CH$_2$)8C(O)NR'(CH$_2$)$_p$NHR', p is 2 to 12 and R' is selected from the group consisting of hydrogen and an alkyl group of 1 to 8 carbon atoms.

13. The polyolefin of claim 1 wherein X is —C(O)NR'(CH$_2$)$_p$NHR', p is 2 to 12, and R' is selected from the group consisting of hydrogen and an alkyl group of 1 to 8 carbon atoms.

14. The polyolefin of claim 1 wherein $$\underset{\underset{Y}{|}}{\overset{\overset{Y}{|}}{C}}=\underset{\underset{Y}{|}}{\overset{\overset{Y}{|}}{C}}$$

contains no more than 30 carbon atoms.

15. A difunctional telechelic linear non-crosslinked polyolefin having a functionality number of 2.0, as determined by NMR, polydispersity is from 1.3 to 3.0, and a polyolefin molecular structure:

$$X-(\underset{\underset{Y}{|}}{\overset{\overset{Y}{|}}{C}}=\underset{\underset{Y}{|}}{\overset{\overset{Y}{|}}{C}}-Q)_m-\underset{\underset{Y}{|}}{\overset{\overset{Y}{|}}{C}}=\underset{\underset{Y}{|}}{\overset{\overset{Y}{|}}{C}}-X$$

wherein $$\underset{\underset{Y}{|}}{\overset{\overset{Y}{|}}{C}}=\underset{\underset{Y}{|}}{\overset{\overset{Y}{|}}{C}}-Q$$

at least one ring-opened olefinic group of a cyclic olefin of from 4 to 30 carbon atoms selected from the group consisting of monocyclic unsaturated hydrocarbon compounds, polycyclic unsaturated hydrocarbon compounds, alicyclic unsaturated hydrocarbon compounds, and mixtures thereof, X is selected from the group consisting of —COOR, —(CH$_2$)$_n$OC(O)R, —(CH$_2$)$_8$COOR, —(CH$_2$)$_n$OH, —(CH$_2$)$_8$COO(CH$_2$)$_p$OH, —COO(CH$_2$)$_p$OH, —(CH$_2$)$_8$C(O)NR'(CH$_2$)$_p$NHR' and —C(O)NR'(CH$_2$)$_p$NHR', wherein Ys are the same or different and are individually selected from the group consisting of hydrogen, halogen, an alkyl group, and an aryl group, wherein p is 2 to 12, wherein R is an alkyl group of from 1 to 8 carbon atoms, R' is selected from the group consisting of hydrogen and an alkyl group of 1 to 8 carbon atoms, n is 1 to 3, and m is a number average value of up to 1000.

* * * * *

UNITED STATES PATENT AND TRADEMARK OFFICE
CERTIFICATE OF CORRECTION

PATENT NO.: 5,731,383
DATED: March 24, 1998
INVENTOR(S): Phillip O. Nubel, Howard B. Yokelson It is certified that error appears in the above-identified patent and that said Letters Patent is hereby corrected as shown below:

| Col. | Line | |
|---|---|---|
| 6 | 17 | reads "1-octene to WC16" <br> should read --1-octene to $WCl_6$-- |
| 10 | 23 | reads "N,N'-dimethylformamide" <br> should read --N,N-dimethylformamide-- |
| 15 | 11 | reads "N,N'-" <br> should read --N,N- -- |
| 20 | 23 | reads "$MeO_2C(CH_2)_7-(CH_2CH==CHCH_2)_n(CH_2)_7CO_2Me$" <br> should read --$MeO_2C(CH_2)_7-(CH_2CH=CHCH_2)_n-(CH_2)_7CO_2Me$-- |
| 26 | 19 | reads ..."$-(CH_2)8C$" <br> should read ...--$(CH_2)_8C$-- |

Signed and Sealed this

Twenty-fourth Day of November, 1998

Attest:

BRUCE LEHMAN

*Attesting Officer*   *Commissioner of Patents and Trademarks*